United States Patent
Williams (10) Patent No.: US 9,165,372 B2
(45) Date of Patent: Oct. 20, 2015

(54) IMPROVEMENTS RELATING TO EVENT DETECTION

(75) Inventor: Mark L. Williams, Bristol (GB)

(73) Assignee: BAE SYSTEMS PLC, London (GB)

(*) Notice: Subject to any disclaimer, the term of this patent is extended or adjusted under 35 U.S.C. 154(b) by 1365 days.

(21) Appl. No.: 11/995,152

(22) PCT Filed: Oct. 10, 2007

(86) PCT No.: PCT/GB2007/003843
§ 371 (c)(1),
(2), (4) Date: Jan. 9, 2008

(87) PCT Pub. No.: WO2008/047077
PCT Pub. Date: Apr. 24, 2008

(65) Prior Publication Data
US 2010/0109867 A1   May 6, 2010

(30) Foreign Application Priority Data

Oct. 16, 2006 (EP) .................................. 06270091
Oct. 16, 2006 (GB) .................................. 0620353.3

(51) Int. Cl.
*H04N 7/18* (2006.01)
*G06T 7/20* (2006.01)
*G06K 9/00* (2006.01)

(52) U.S. Cl.
CPC .............. *G06T 7/20* (2013.01); *G06K 9/00778* (2013.01)

(58) Field of Classification Search
USPC .......................................... 348/169; 382/103
See application file for complete search history.

(56) References Cited

U.S. PATENT DOCUMENTS

| | | | |
|---|---|---|---|
| 6,400,830 B1* | 6/2002 | Christian et al. | 382/103 |
| 6,731,799 B1* | 5/2004 | Sun et al. | 382/173 |
| 2002/0099518 A1* | 7/2002 | Tovinkere et al. | 702/179 |
| 2003/0107649 A1* | 6/2003 | Flickner et al. | 348/150 |
| 2004/0071209 A1* | 4/2004 | Burg et al. | 375/240.01 |
| 2007/0121999 A1* | 5/2007 | Ma et al. | 382/103 |

FOREIGN PATENT DOCUMENTS

| | | | |
|---|---|---|---|
| GB | 2398423 A | * | 8/2004 |
| JP | 2006-31645 | | 2/2006 |

OTHER PUBLICATIONS

International Preliminary Report on Patentability in related application PCT/GB2007/003843 mailed Apr. 22, 2009, 7 pages.
International. Search Report (PCT Article 18) issued in PCT/GB2007/003843, dated Feb. 5, 2008, 4 pages.
(Continued)

*Primary Examiner* — Jeffrey R Swearingen
(74) *Attorney, Agent, or Firm* — Pillsbury Winthrop Shaw Pittman, LLP (57) ABSTRACT

A method of event detection for detecting the occurrence of an event in a crowd is disclosed. The method includes the steps of providing video footage of the crowd, which video footage includes a series of image frames; calculating a series of values representative of the crowd dynamics, which series of values is calculated in dependence on the series of image frames; analyzing the series of values to identify any discrepancies occurring in the series of values; and, in response to identifying a discrepancy, providing an output signal to alert an operator that an event has been detected. In preferred embodiments, the series of values are related to the complexity of the crowd dynamics. Apparatus suitable for carrying out such a method is also disclosed.

17 Claims, 5 Drawing Sheets

(56) References Cited

OTHER PUBLICATIONS

Written Opinion of the International Searching Authority issued in PCT/GB2007/003843, dated Feb. 5, 2008, 8 pages.
Search Report under Section 17, for GB0620353.3, dated. Jan. 9, 2007, 1 page.
European Search. Report issued in EP 06 27 0091, dated Mar. 13, 2007, 3 pages.
Boghossian et al., "Motion-Based Machine Vision Techniques for the Management of Large Crowds", Electronics ciricuits and Systems, 1999, Proceedings of ICECS '99. The $6^{th}$ IEEE International Conference on Pafos, CYPRUS Sep. 5-8, 1999, IEEE, vol. 2, Sep. 5, 1999, pp. 961-964.
Wright et al., "A Generalisable Measure of Self-Organisation and Emergence", Lecture Noted in Computer Science: Artificial Neural Networks—ICANN 2001, vol. 2130, Aug. 2001, pp. 857-864.

Dahmane et al., "Real-Time Video Surveillance with Self-Organizing Maps", Proceedings of the Second Canadian Conference on Computer and Robos Vision, May 9, 2005, pp. 136-143.
Hu et al., A Survey on Visual Surveillance of Object Motion and Behaviors:, IEEE Transactions on Systems, Man and Cybernetics: Part C: Applications and Reviews, IEEE, vol. 34, No. 3, Aug. 2004, pp. 334-352.
Velastin et al. "A motion-based image processing system for detecting potentially dangerous situations in underground railway stations", Transportation Research. Part C, Emerging Technologies, vol. 14, No. 2, Apr. 2006, pp. 96-113.
Ho Ats et al., :Dynamic image analysis of crowd density and motion estimation, WoSPA Second Australian Workshop on Signal Processing Applications '97, 1997, pp. 77-80.

* cited by examiner

IMPROVEMENTS RELATING TO EVENT DETECTION

CROSS REFERENCE TO RELATED APPLICATIONS

This is the U.S. National Phase of PCT/GB2007/003843, filed Oct. 10, 2007, which claims priority to British Application No. 0620353.3, filed Oct. 16, 2006, and European Application No. 06270091.9, filed Oct. 16, 2006, all of which are incorporated herein in their entirety by reference.

This invention relates to a method and apparatus for detecting the occurrence of events in crowds, which events are captured in video footage (such as closed circuit television (CCTV) footage). The present invention may be used either to monitor video footage in real time, and alert an operator when an event occurs, or may be used to analyse pre-recorded video footage in order to search for events.

There are a great many 'events' that merit detection by security systems aimed at counter-terror and anti-social behaviour. One important subset is that of events which occur in or near crowds, since crowds are often either the target, or reason, for events of interest. There may be a wide variety of diverse events of interest that it would be desirable to detect. An area of particular interest and concern is the problem of detecting unforeseen events, since, a priori, it may not be known even what type of event it is desirable to detect. Events that are understood, or expected, can be detected using a set of heuristic rules, but this is not possible where the type of event to be detected is unknown, and, moreover, becomes, impractical when there is a desire to detect many different types of event. Events of interest may include terrorist attacks; fires, earthquakes, or other disasters; the beginnings of social unrest; the presence of unusual packages; or even one person acting unusually.

There are a number of well-known complexity measures that relate to the effective number of degrees of freedom in a system, or the dimensionality of a data set. One known complexity measure is described in by W. A. Wright, R. E. Smith, M. Danek, and P. Greenway in their paper "A Generalisable Measure of Self-Organisation and Emergence", published at pages 857 to 864 of "Artificial Neural Networks—ICANN 2001" by Springer-Verlag (2001) and edited by G. Dorffner, H. Bischof, and K. Hornik. Wright et al. associate a system's ability to exhibit emergent behaviour with sudden transitions in their complexity measure, relative to smooth changes in system parameters. In this context, emergent behaviour may include, for example, the sudden dispersion of a school of fish in response to the arrival of a predator. Wright et al. suggest that their measure could be used to evaluate and encourage desirable behaviours in a variety of complex systems, including artificial neural systems, evolutionary computation systems, and reinforcement learning systems. However, they unfortunately fail to realise how their complexity measure could be applied in other fields.

It is an object of the present invention to provide an improved method and apparatus for event detection. It is a further object of the present invention to provide a method and system for event detection that overcomes, or at least mitigates, at least some of the above mentioned problems associated with prior-known event detection systems and methods.

In broad terms, the present invention resides in the realisation that analysis of crowd dynamics can be applied to the detection of events occurring in crowds. This enables an event of Interest to be detected through the reaction of a crowd to that event, rather than by direct observation of the event. Event detection systems and methods in accordance with the present invention are therefore sensitive to a wide variety of events: the invention provides an event detector that is sensitive to the way in which the crowd reacts, as reflected through changes in the crowd motion, rather than a specific type of event.

Therefore, in accordance with a first aspect of the present invention, there is provided a method of detecting the occurrence of an event in a crowd, the method comprising the steps of:
  (a) providing video footage of the crowd, the video footage comprising a series of image frames;
  (b) calculating, for each of the series of image frames, a value representative of the crowd dynamics, the value being calculated in dependence on said each of the series of image frames, thereby calculating a series of values;
  (c) analysing the series of values to identify any discrepancies occurring in the series of values; and
  (d) in response to identifying a discrepancy, providing an output signal to alert an operator that an event has been detected.

Thus the reactions of the crowd to an event, analysed in terms of the crowd dynamics, are used to detect the occurrence of that event. The crowd has numerous proximal points of view with which to monitor its surroundings, and in addition the crowd might react to smells, such as smoke, and to audible cues, such as warnings or explosions. Such smells and audible cues cannot be directly detected by a video surveillance system. Moreover, the crowd can identify peculiar or unusual behaviour using subtle clues such as body language that cannot be reliably read from a more remote viewing. The 1995 nerve gas attack on the Tokyo underground is an example of an event—the release of a toxic gas—that could have been detected indirectly through the reaction of those persons exposed to the gas, but not directly through video footage. By analysing the dynamics of crowd, and monitoring the dynamics in real time through use of some value representative of the dynamics, the invention allows a wide variety of events to be detected as discrepancies in the representative value.

The step of analysing the series of values may comprises the step of providing a normal range of values, and a discrepancy may then be identified when the value is outside the normal range. The normal range may be a predetermined range, or may be determined in dependence on the mean and standard deviation of the series of values. Advantageously, this simplifies the process of identifying discrepancies, and is readily implemented automatically by appropriate processing means such as a computer.

In one embodiment, the method further comprises the steps of tracking a number of targets moving within the crowd to determine a number of target tracks, and updating the target tracks in response to each successive image frame; wherein the step of calculating a series of values comprises determining a value in dependence on the updated target tracks. The updated target tracks are a direct measure of the crowd dynamics, and therefore little useful information is lost in the processing of the series of images. Conveniently, the step of calculating a series of values comprises the step of forming a track matrix comprising rows, each row representing a target track, and evaluating Wright's complexity metric for the track matrix. Herein, the term 'Wright's complexity metric' is used to refer to the complexity metric derived by Wright et al. in their above-referenced paper.

Alternatively, the step of calculating a series of values may comprise calculating a series of difference images in dependence on the series of image frames, the difference image for a current image frame being related to differences between the current image frame and a preceding image frame. Conveniently, the preceding image frame may be the image frame Immediately preceding the first image frame in the series of image frames. Calculation of the series of values representative of the crowd dynamics from a series of difference images, rather than from a series of target tracks, avoids the problem of requiring complex tracking techniques to track individual targets within the crowd, thus simplifying the event detection method.

Conveniently, the step of calculating the series of values in dependence on the difference images may comprise, for each of the series of values, the steps of: forming a difference matrix, the difference matrix comprising a number of rows and each row representing one of the series of difference images; and evaluating Wright's complexity metric for the difference matrix to provide said each of the series of values. The method may further comprise the step of lowering the resolution of at least one of the series of image frames prior to calculating the series of values, advantageously enhancing the efficiency of the processing of the difference matrix.

Optionally, the method is performed in real time.

Conveniently, the series of values comprises a series of complexity values. Complexity values can be related to the number of effective degrees of freedom exhibited in the crowd dynamics. The complexity value is a scalar quantity that can be easily monitored.

The invention extends to a computer program product comprising computer readable instructions, which product is operable, when inserted into a computer in operable association with a video camera, to perform a method as claimed in any preceding claim.

According to a second aspect of the invention, there is provided an event detection system comprising a video camera, a processor, and an alert means; the video camera being operable to record video footage, and to transmit said video footage to the processor, said video footage comprising a series of image frames; and the processor comprising means to calculate, for each of the series of image frames, a value representative of the crowd dynamics, the value being calculated in dependence on said each of the series of Image frames, such that a series of values is calculated; and means to analyse the series of values to identify any discrepancies occurring in the series of complexity values; and wherein the alert means is configured to alert an operator in response to the occurrence of any discrepancies identified by the processor.

The above and further features of the invention are set forth in the appended claims, and will be explained in the following, by way of example only, with reference to various specific embodiments which are illustrated in the accompanying drawings, in which:

Figure 1:
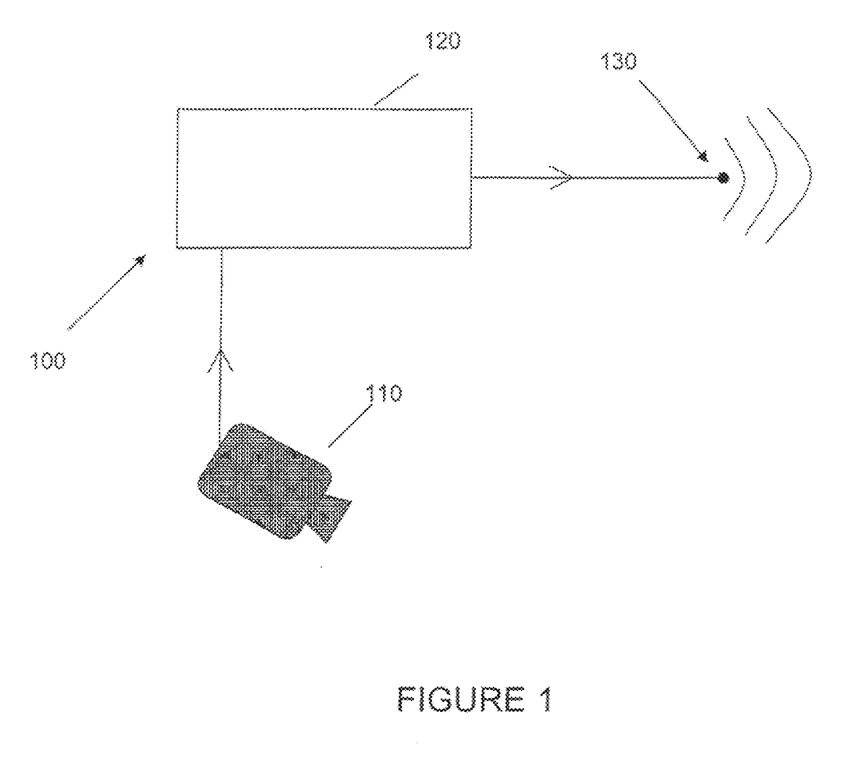
FIG. 1 is a schematic view of apparatus according to a first embodiment of the invention.

Referring firstly to FIG. 1, there is shown apparatus 100 in accordance with a first embodiment of the invention. Apparatus 100 comprises a video camera 110, processor 120, and alert means 130. Video camera 110 is arranged to monitor an area of interest in which there is a crowd. The area of interest may be a crowded high street, an airport terminal, or even a road on which traffic is flowing. Thus it will be understood that the term 'crowd', as used herein, should be construed broadly to include any collection of targets of interest, and also to include collections of targets of interest that move through an area, whether or not the targets are simultaneously present in that area. Camera 110 may be any type of device operable to record a series of images of its field of view, as will be understood by those skilled in the art, but in this particular embodiment, camera 110 is a CCTV camera.

Video footage, In the form of a series of image frames, is output from camera 110 to processor 120. In the present embodiment, processor 120 monitors the images it receives in real time in order to detect the occurrence of events. For each received image, a complexity value is calculated, so that the processor 120 calculates a series of complexity values. The complexity is a useful quantity to measure because it is representative of the crowd dynamics. More particularly, it is related to the effective number of degrees of freedom present in the movement of the members of the crowd. Consider a simple situation in which system 110 is monitoring a crowd of people in a large hall. Under normal circumstances, people in the crowd will move largely at random, with little correlation between the paths taken by individuals. However, should there be, for example, a fire at one end of the room, people in the crowd would begin to move towards exits, and there would be much greater correlation between the movement of individuals within the crowd. In the latter situation, the effective number of degrees of freedom of movement of the crowd is lowered, and thus the fire would be detected as an event. Notably, the event would be detected even if the fire were not in the field of view of camera 110. The manner in which the calculation of the complexity value is performed will be described in detail hereinafter.

The standard deviation and mean of the series of complexity values are calculated, and a normal range is defined as two standard deviations either side of the mean. If the value calculated for a given image frame is outside this normal range, processor 120 provides a signal, via alert means 130, to an operator. In this specific embodiment, alert means 130 is an audible alarm. As explained above, deviation from the normal range of complexity values can be associated with the occurrence of an event of interest, and the alert provided to the operator allows the operator to investigate more closely. For example, where the operator must monitor the output of not just camera 110, but also several cameras, the alert may cause the operator to look at the footage recorded by camera 110 more closely.

Figure 2:
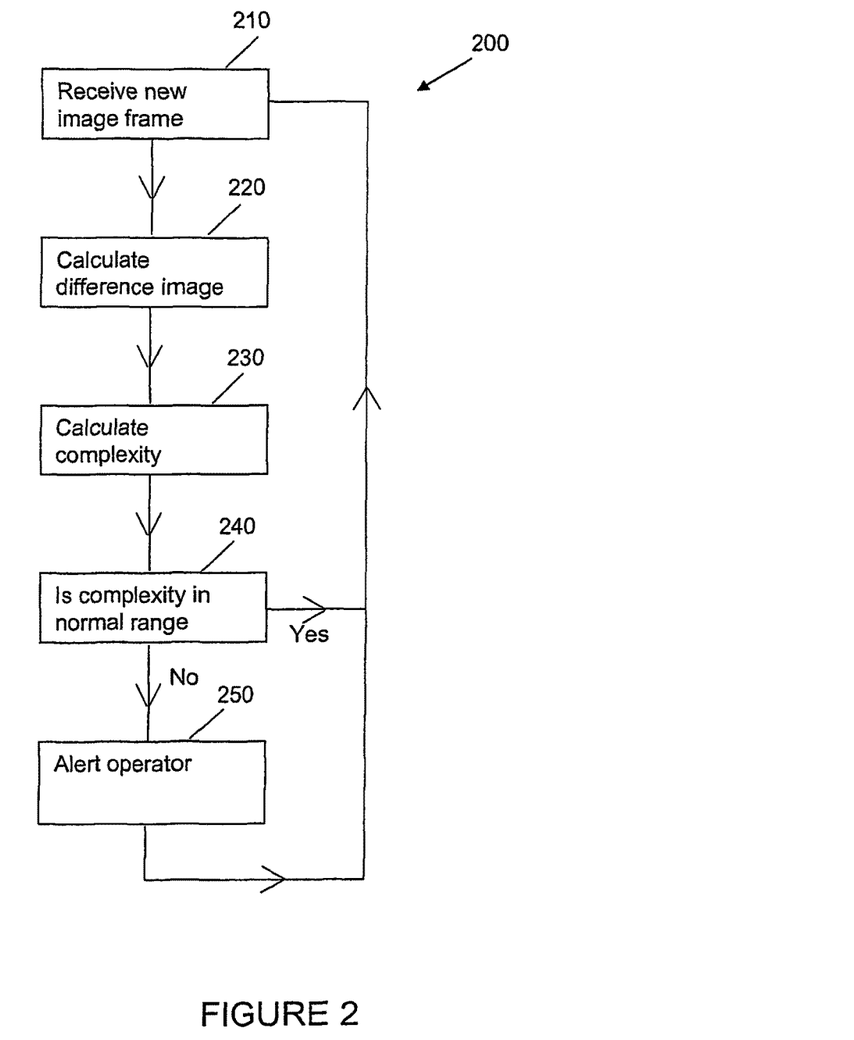
FIG. 2 is a flow diagram schematically illustrating steps performed in operation of the embodiment of FIG. 1.

The operation of processor 120 is shown schematically in flow diagram 200, which illustrates the steps carried out by processor 120 in determining whether an alert should be given in response to the receipt of a new image frame. Flow diagram 200 therefore takes, as its starting point, the receipt of a new image frame by processor 120, which step is illustrated as step 210. In the following, this newly received image frame is referred to as the current image frame. At step 220, a difference image is calculated. The difference image is indicative of how the current image frame has changed relative to a preceding frame. Images can be represented in the form of a matrix of the pixel values, and the difference image is calculated by subtracting, from the matrix representing the current image frame, the matrix representing the image frame received immediately prior to the current image frame.

The calculation of a difference image at step 220 considerably simplifies subsequent computations to be carried out on the images, since pixels unchanged between the two frames will all, in the difference image, be represented by a matrix element having a value of zero. Moreover, this removes redundant, background information from the current image frame. Processing can be further simplified by the application of a threshold to the difference image matrix, such that elements having a value below a preset threshold value are given a value of zero, and elements having a value above a preset threshold value are given a value of one. The difference image matrix is thus mapped to a binary matrix, and consists of elements having a value of either 1 or 0. In some circumstances, and particularly where only few pixels change values between frames, it is advantageous to interchange the elements, such that elements previously having a value of 0 are changed to have a value of 1, and vice versa. This is because there can be numerical instabilities in the complexity calculation described below (and in particular at the step of singular value decomposition) where the matrix has a large population of zero-valued elements.

At step 230, a complexity value is calculated using data from a number of difference images stored by processor 100, and data from the difference image calculated from the current image frame. The stored difference images are those immediately preceding the current image frame. Processor 120 stores a constant number of difference, images so that, in response to the current image frame being received (at step 210) and its associated difference image being calculated (at step 220), the oldest difference image stored is deleted. In the present embodiment, twenty difference images are stored at any one time. The complexity value is then calculated, from a difference matrix Z defined by:

$$Z = \begin{pmatrix} x^1_{t=t_0} & x^2_{t=t_0} & x^3_{t=t_0} & \cdots & x^N_{t=t_0} \\ x^1_{t=t_0+1} & x^2_{t=t_0+1} & x^3_{t=t_0+1} & \cdots & x^N_{t=t_0+1} \\ \vdots & & & & \\ x^1_{t=T} & x^2_{t=T} & x^3_{t=T} & \cdots & x^N_{t=T} \end{pmatrix}$$

in which the element $x_{t=j}^n$ is the value of the nth pixel in the difference image recorded at t=j. Thus, the matrix representing the difference image at t=j is converted into a row of pixel values, and the difference matrix Z is comprised of nineteen rows representing difference images calculated from a series of nineteen consecutive image frames received immediately prior to the current image frame, and the difference image calculated for the current image frame. The difference image calculated from the current image frame is that labelled t=T, and the oldest difference image is that labelled t=$t_0$.

In effect, therefore, as each new difference image is calculated, a complexity value is evaluated using a window of image frames, which window is of constant size (T−$t_0$) and, in this specific embodiment, is equivalent to twenty image frames. As will be clear to those skilled in the art, the time index is measured in terms of the number of image frames received. As will also be clear to those skilled in the art, it is necessary to initialise difference matrix Z when monitoring begins, but how this is done is not critical since the initialisation procedure does not affect the calculations once more than (T−$t_0$) images have been recorded by video camera 110. One possible initialisation technique that is used in the present embodiment is to define an initial matrix $Z_0$, of an appropriate size, whose elements are all valued at unity.

The complexity value is evaluated using Wright's complexity metric:

$$\Omega = 2^S$$

where $$S = \sum_{i=1}^{M} \sigma'_i \log_2 \sigma'_i$$

and $\sigma'_i$ is the ith normalised singular value of difference matrix Z. The normalised singular values are obtained using singular value decomposition, a well-known operation applicable to any matrix that yields a diagonal matrix having diagonal entries that are the singular values of the original matrix. For any real matrix A, the singular values are the square roots of the eigenvalues of the matrix A*A, where A* denotes the transpose of matrix A. These values are normalised using a simple scaling procedure that scales the largest singular value of matrix Z to 1. The complexity metric $\Omega$ is derived in the paper by Wright et al. referred to above, and can be viewed as representing the effective number of degrees of freedom exhibited by the crowd.

The calculation of $\Omega$, and particularly the step of singular value decomposition leading to the values $\sigma'_i$, can be numerically lengthy where the number of pixels in each image frame is large. The required processing time for this calculation can be reduced by lowering the resolution of the image frames, thus reducing the number of pixels. Since each element in the difference matrix Z is related to a pixel in a difference image, the number of elements in each row of the difference matrix Z, and therefore the overall size of difference matrix Z, is reduced by lowering the resolution of the input image frames. This shortens the amount of processor time required for the calculation of $\Omega$, largely because of the reduction in the amount of time needed for the step of singular value decomposition. It can be determined by trial and error how much the resolution of the images can be reduced, but it is noted that the competing requirements of speed of processing, and sufficiency of resolution to capture Information relating to the crowd dynamics, must both be satisfied.

At step 240, the complexity evaluated at step 230 is compared to a normal range. The normal range, as described hereinabove, is defined to be within predetermined threshold values, set by an operator, that vary according to the standard deviation of the series of complexity values. In this particular embodiment, the normal range is chosen to be a range of two standard deviations either side of the mean of the complexity values. If the complexity value evaluated at step 230 is within the normal range, processor 120 returns to step 210 and awaits a further new image frame. If the complexity value is outside the normal range, processor 120, at step 250, provides an output to alert means 130 such that an operator is alerted to the discrepancy in the series of complexity values. The operator can then investigate further the causes of the discrepancy, for example by focusing attention on the output from camera 110.

Figure 3:
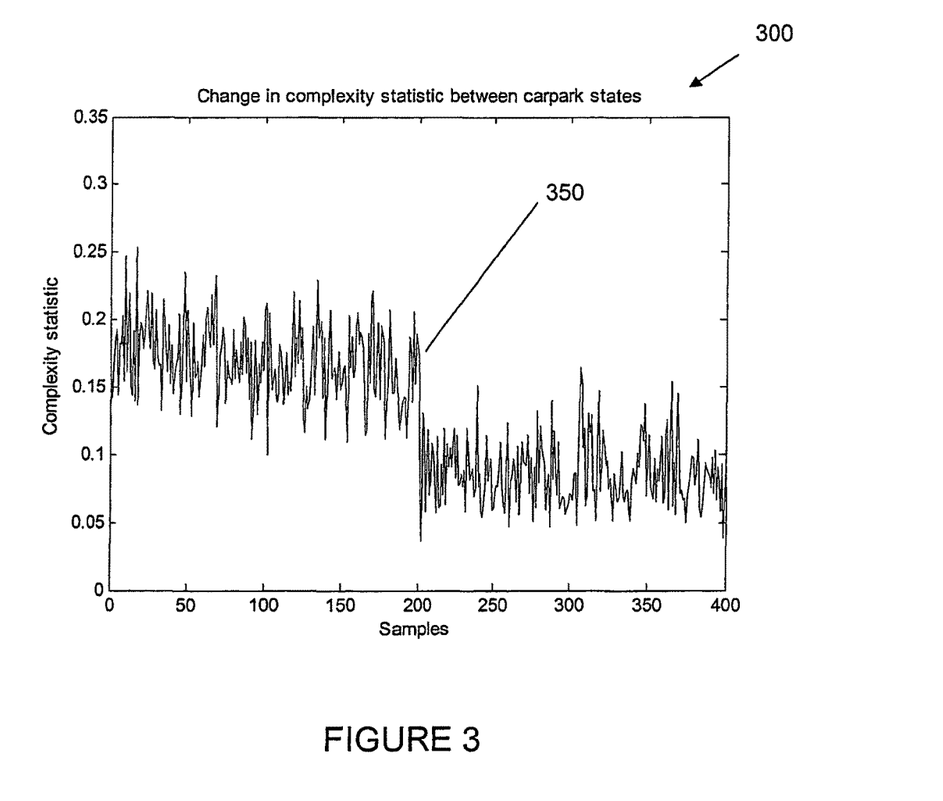
FIG. 3 is a graph illustrating data recorded during the test of the method illustrated in the flow diagram of FIG. 2.

The method illustrated by flow diagram 200 shown in FIG. 2 has been demonstrated to work successfully using sample data from a car park. An artificial event was created by placing a "scarecrow" in the car part approximately half-way through the trial period. FIG. 3 is a graphical representation of the variation of the complexity measure with time, as measured using a method in accordance with the second embodiment of the invention. The presence of the scarecrow alters the path that persons walking across the car park take, and this is seen in graph 300 of FIG. 3 as a transition (labelled 310) in the variation of the complexity with time.

The transition 310 is clearly a statistically significant transition of the type that would be readily detectable by automatic means. In fact, the shift in the mean complexity value on placing the scarecrow in the car park is approximately equivalent to thirteen standard deviations. The complexity measure was evaluated, in this example, using an image resolution of approximately one pixel per person, equivalent to approximately 500 pixels per frame. Such a resolution was found to be sufficiently computationally efficient and still allowed for satisfactory event detection. Lowering the resolution further was found to have the effect of lowering the significance of the transition 310 in the complexity measure, since the standard deviation of the series of complexity values increased. Thus the detection of any discrepancies in the series of values was rendered less likely by lowering the resolution of the image frames.

As described above, the complexity measure derived by Wright et al, is related to the dynamics of the objects to which it is applied. It is therefore surprising that the application of Wrights complexity metric to a matrix Z comprising elements representing pixel values should result in any meaningful value. However, it is thought that the difference images do, in fact, retain some information on the crowd dynamics which can be extracted through application of the complexity metric. Information contained within the difference images relates only to those pixels whose values have changed between consecutive frames.

These changed pixels are clearly indicative of movement within the crowd, since any such movement will cause pixel values to change. Thus the difference matrix Z may be successfully used in combination with the complexity measure for the purposes of event detection.

Furthermore, whilst the 'event' in the car park example above, of a scarecrow appearing next to a parked car, is entirely artificial, those skilled in the art will immediately recognise that there are many circumstances in which a crowd of people would react similarly to an event worthy of detection. For example, a crowd would be likely to react to the presence of a suspicious unattended package: individuals in the crowd would be likely to alter their paths in order to move further away from the package. Such a reaction would be detected by a system according to the first embodiment of the invention. Notably, it is the reaction of the crowd, rather than the presence of the suspicious package, that is detected. A system able to automatically detect such events has clear utility in the field of homeland security.

Figure 4:
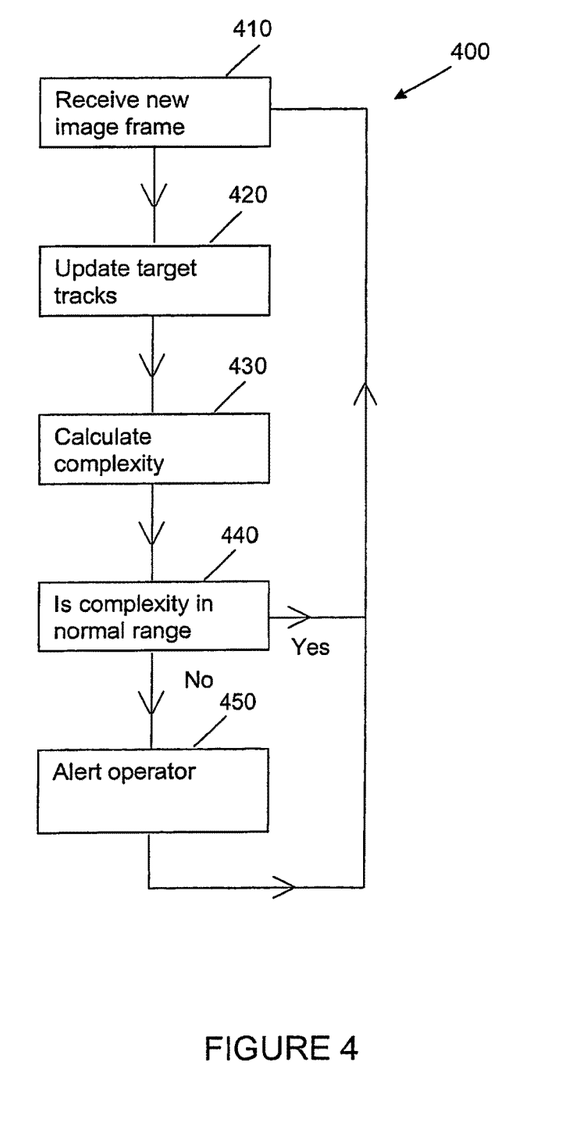
FIG. 4 is a flow diagram schematically illustrating steps performed as part of a method in accordance with a further embodiment of the invention.

A method in accordance with a further embodiment of the invention is illustrated schematically by flow diagram 400 shown in FIG. 4. The method of this embodiment uses the apparatus 100 illustrated in FIG. 1, and is similar to the method of this embodiment illustrated schematically by flow diagram 200 shown in FIG. 2, except in the processing of the image data used to calculate the complexity measure. In the flow diagram 400 of FIG. 4, step 410 represents a new image frame being received by processor 120 (FIG. 1). The image is taken to be of an area in which there are a number of targets of interest moving, which targets may, for example, be cars moving in traffic on a busy street. The targets are tracked by processor 120, and their tracks recorded and updated in response to the receipt of each new image frame. The step of updating the target tracks is represented as step 420 in flow diagram 400. The targets may be tracked using any known tracking algorithm, such as a Kalman Filter algorithm (disclosed by R. E. Kalman in "A New approach to linear filtering and prediction problems", published in the Transactions of the ASME Journal of Engineering, pages 33 to 45 (1960)), or a particle filter algorithm (disclosed by N. Gordon, D. Salmond, and A. Smith in their paper "Novel Approach to non-linear/non-Gaussian Bayesian State Estimation", published in IEE Proc. F, volume 140, no. 2, pages 107 to 113 (1993)), in conjunction with a suitable target detection method, such as, for example, a template-matching technique. The template-matching technique requires a processor to attempt to match a template learned in advance to a part of a received image. Where a match is found, a target is identified.

At step 430, the complexity of the tracks is evaluated using Wright's complexity measure Ω defined above. In this case, the matrix Z comprises rows of data that represent the target tracks rather than data from the difference images, and is therefore referred to in the following as a track matrix. Thus, for example, each row may comprise coordinates, in the image frame, of each target, with the time evolution of the tracks being recorded as new rows added to the track matrix with each new image received. The complexity value is then calculated as above, using Wright's complexity metric. It is noted that lowering the resolution of the images before calculating the complexity value is unnecessary in this case, since there is no link between image resolution and the size of the track matrix. In fact, it is expected that a reduction in image resolution would have the undesirable effect of lowering the reliability of the tracking algorithm used to track targets through the video footage. At step 440, it is determined whether or not the complexity value lies within a defined normal range, as described above in relation to step 240 of flow diagram 200 illustrated in FIG. 1. If the complexity value is within the normal range, the process returns to step 410. If it is outside of the normal range, an operator is alerted to the discrepancy at step 450, and the process returns to step 410.

The method of the embodiment illustrated in FIG. 4 is also applicable to targets other than cars, and, in particular, is applicable to crowds of people. The method can therefore be quantitatively compared to that illustrated in FIG. 2, and the inventors have shown that the FIG. 4 method can produce better results than the FIG. 2 method. A comparative test, analysing the same video data shown in FIG. 2 using the method of the embodiment illustrated in FIG. 4 showed a shift of 22, rather than 13, standard deviations of the complexity value on placing the scarecrow in the car park. This is thought to be because the track data is more closely related to the dynamics of the target crowd than the pixel-based data. However, in this example, the tracking of people moving across the car park was performed manually, rather than using any known tracking algorithms, because known tracking algorithms are frequently unreliable for tracking people. People can change shape as they move, can change their appearance significantly by turning and changing the aspect presented to the camera, and can be partially or completely obscured by the objects in the frame. Thus it can be very difficult to successfully track a person through a series of image forms because of problems associated with target detection. Template matching techniques (as described briefly above) can be used, as can model-based database techniques, in which use prior knowledge of the known skeletal system, and the manner in which is moves, to impose constraint on target detection. However, such techniques can require significant processing power.

Figure 5:
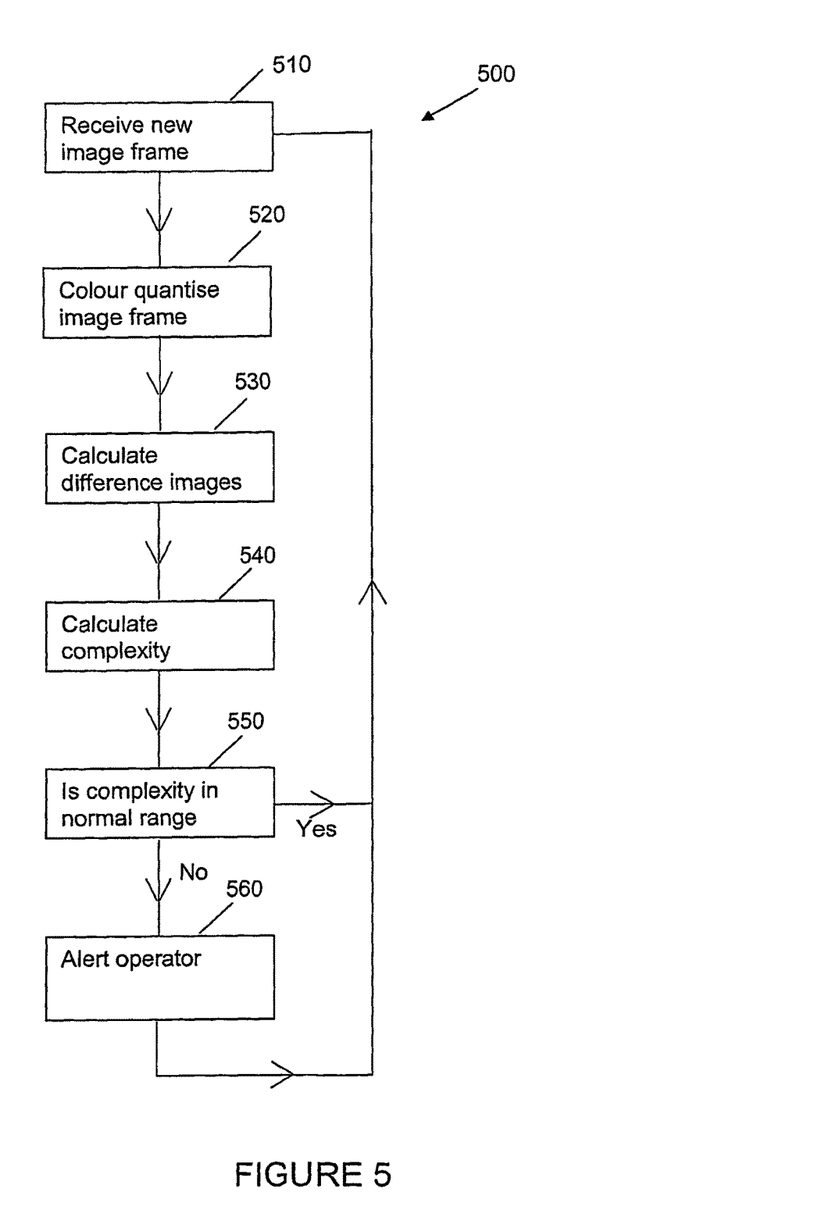
FIG. 5 is a flow diagram schematically illustrating steps performed as part of a method in accordance with a further embodiment of the invention.

A method in accordance with a yet further embodiment of the invention is illustrated schematically in flow diagram 500 shown in FIG. 5. The method can be performed using apparatus 100 shown in FIG. 1 where camera 110 is operable to output colour image frames to processor 120. The steps illustrated in flow diagram 500 are similar to the steps illustrated in flow diagram 200 shown in FIG. 2, except in that the image is colour quantised at step 520 before difference images and complexity values are calculated. Thus, at step 510, a new image frame is received at processor 120 (shown in FIG. 1). At step 520, the image frame is colour quantised. In the colour image frame, each pixel has a colour value. The colour quantisation process assigns a value of 1 or 0 to each pixel in dependence on whether its colour lies between a predetermined range of colour values. A number of colour quantised image matrices can therefore be produced, covering the spectrum of colours to which camera 110 is sensitive. Difference images can then be calculated, at step 530, for each of the colour quantised images, and thus a difference matrix can be calculated for each colour range. Thus each new image frame generates a number of difference matrices, complexity values for which are evaluated at step 540 using Wright's complexity metric defined above. The various complexity values for each of the difference matrices are summed in order to arrive at a single complexity value for the image frame. At step 550, it is determined whether or not the single complexity value is within a normal range (in the same way as is done at step 240 in the method illustrated in flow diagram 200). If the value is within the normal range, the processor returns to step 510 and awaits a new image frame; if the complexity value is without the normal range, an operator is alerted at step 560. The inclusion of the step of colour quantisation has been found to result in a more effective event detection method in some trials using real footage.

Having described the invention with reference to various specific embodiments, it is noted that these embodiments are in all resects exemplary. Variations and modifications are possible without departing from the scope of the invention, which is defined in the accompanying claims. Such variations and modifications will be immediately obvious to those skilled in the art. For example, whilst, in the above, it has been described to define a normal range in terms of the standard deviation and mean of the series of complexity values, it would of course also be possible for an operator to provide predetermined thresholds, or indeed for a discrepancy to be identified when the value changes by more than a predefined amount between two (or more) Image frames.

It has also been described in the above to calculate a series of complexity values in dependence on the series of image frames using Wright's complexity metric $\Omega$, but it will be immediately recognised by those skilled in the art that other complexity measures, or, indeed, any measure representative of the crowd dynamics could be used in place of Wright's complexity measure $\Omega$. Such values may be other values related to the number of effective degrees of freedom, or may be marginal statistical values. Examples include Lyapunov exponents, the mean velocity of the targets of interest making up the crowd, or the length of the average straight-line path of the targets of interest making up the crowd. Moreover, it is to be understood that the invention can be applied both in real time, as described above, in order to alert an operator to the occurrence of an event, and in later analysis of video footage captured at an earlier time. The ability to analyse previously obtained video footage is useful for footage acquired from security cameras, since it can significantly reduce the amount of manual labour required to identify a sequence of interest in the footage.

Finally, it is noted that it is to be clearly understood that any feature described above in relation to any one embodiment may be used alone, or in combination with other features described, and may also be used in combination with one or more features of any other of the embodiments, or any combination of any other of the embodiments.

The invention claimed is:

1. A method of detecting the occurrence of an event in a crowd based on analysis of video footage of the crowd, the video footage comprising a series of image frames, the method being performed by at least one processor and comprising the steps of:
    (a) receiving the video footage at the at least one processor;
    (b) calculating, for each of the series of image frames, a complexity value indicative of overall crowd movement dynamics, the complexity value being calculated in dependence on said each of the series of image frames, thereby calculating a series of complexity values;
    (c) analysing the series of complexity values to identify any changes occurring among the series of values; and
    (d) in response to identifying a change among the series of complexity values having a magnitude in excess of a threshold, transmitting an output signal to alert an operator that the event has been detected.

2. The method as claimed in claim 1 wherein the step of analysing the series of complexity values comprises the step of providing a normal range of complexity values, and wherein a change is identified when a complexity value of the series of complexity values is outside the normal range, at least one boundary of the normal range being defined by said threshold.

3. The method as claimed in claim 2 wherein the normal range is determined in dependence on a mean and standard deviation of the series of complexity values.

4. The method as claimed claim 1 further comprising the steps of tracking a number of targets moving within the crowd to determine a number of target tracks, and updating the target tracks in response to each successive image frame; and wherein the step of calculating the series of complexity values comprises determining the complexity value from the series of values in dependence on the updated target tracks.

5. The method as claimed in claim 4 wherein the step of calculating the series of complexity values comprises the step of forming a track matrix comprising rows, each row representing a target track, and evaluating Wright's complexity metric for the track matrix.

6. The method as claimed in claim 1 wherein the step of calculating the series of complexity values comprises calculating a series of difference images in dependence on the series of image frames, the difference image for a current image frame being related to differences between the current image frame and a preceding image frame.

7. The method as claimed in claim 6, wherein the preceding image frame is the image frame immediately preceding the current image frame in the series of image frames.

8. The method as claimed in claim 6 wherein the step of calculating the series of complexity values comprises, for each of the series of complexity values, the steps of:
    forming a difference matrix, the difference matrix comprising a number of rows and each row representing one of the series of difference images; and
    evaluating Wright's complexity metric for the difference matrix to provide said each of the series of complexity values.

9. The method as claimed in claim 6, further comprising the step of lowering a resolution of at least one of the series of image frames prior to calculating the complexity series of values.

10. The method as claimed in claim 1 wherein the method is performed in real time.

11. The method as claimed in claim 1, wherein said complexity value for each image frame is determined based on an analysis of a correlation of movement of targets within said crowd.

12. The method as claimed claim 11 wherein the analysis of the correlation of movement of the targets with said crowd is performed by tracking a number of targets moving within the crowd to determine a number of target tracks, and updating the target tracks in response to each successive image frame; and wherein the step of calculating the series of complexity values comprises determining a complexity value from the series of values in dependence on the updated target tracks.

13. The method as claimed in claim 1, wherein said complexity value for each of the series of image frames is related to an effective number of degrees of freedom of the overall crowd movement dynamics.

14. A computer program product embodied on a non-transitory computer-readable storage medium comprising computer readable instructions, which product is operable, when inserted into a computer in operable association with a video camera, to perform a method of detecting the occurrence of an event in a crowd, based on analysis of video footage of the crowd, the video footage comprising a series of image frames, the method comprising the steps of:
  (a) calculating, for each of the series of image frames, a complexity value indicative overall crowd movement dynamics, the complexity value being calculated in dependence on said each of the series of image frames, thereby calculating a series of complexity values;
  (b) analysing the series of complexity values to identify any changes occurring among the series of values; and
  (c) in response to identifying a change among the series of complexity values having a magnitude in excess of a threshold, providing an output signal to alert an operator that an event has been detected.

15. An event detection system comprising a video camera, at least one processor, and an alert means; the video camera being operable to record video footage of a crowd, and to transmit said video footage of the crowd to the at least one processor, said video footage comprising a series of image frames; and the at least one processor being configured to calculate, for each of the series of image frames, a complexity value indicative of overall crowd movement dynamics, the complexity value being calculated in dependence on said each of the series of image frames, such that a series of complexity values is calculated; and means the at least one processor also being to configured to analyse the series of values to identify any changes occurring among the series of complexity values; and wherein the alert means is configured to alert an operator in response to the at least one processor identifying a change among the series of complexity values having a magnitude in excess of a threshold.

16. The event detection system as claimed in claim 15 configured to operate in real time.

17. The system of claim 15, wherein the at least one processor is one processor.

* * * * *